United States Patent [19]

Chiu et al.

[11] Patent Number: 5,929,962
[45] Date of Patent: Jul. 27, 1999

[54] METHOD AND APPARATUS FOR INTEGRATING MICROLENS ARRAY INTO A LIQUID CRYSTAL DISPLAY DEVICE USING A SACRIFICIAL SUBSTRATE

[75] Inventors: George Liang-Tai Chiu, Cross River; Fuad Elias Doany, Katonah, both of N.Y.; Rama Nand Singh, Bethel, Conn.

[73] Assignee: International Business Machines Corporation, Armonk, N.Y.

[21] Appl. No.: 09/017,867

[22] Filed: Feb. 3, 1998

[51] Int. Cl.⁶ .......................... G02F 1/13; G02F 1/1335; G02F 1/1333
[52] U.S. Cl. ........................ 349/187; 349/95; 349/158
[58] Field of Search ........................ 349/95, 158, 187

[56] References Cited

U.S. PATENT DOCUMENTS

| | | | |
|---|---|---|---|
| 4,836,652 | 6/1989 | Oishi et al. | 349/95 |
| 5,414,276 | 5/1995 | McCarthy | 257/57 |
| 5,600,456 | 2/1997 | Maruyama et al. | 349/95 |
| 5,608,551 | 3/1997 | Biles et al. | 349/95 |
| 5,666,176 | 9/1997 | Kurematsu | 349/95 |
| 5,680,186 | 10/1997 | Watanabe et al. | 349/95 |

FOREIGN PATENT DOCUMENTS 0 444 872   6/1995   European Pat. Off. .

OTHER PUBLICATIONS

C. Narayan et al. (1995) "Thin Film Transfer Process for Low Cost MCM–D Fabrication" *IEEE Trans. of Components, Packaging and Manufacturing Technology–Part B* 18(*1*):42–46.

A. Lien and R.A. John (1992) "Lateral Field Effect in Twisted Nematic Cells" *IBM J. Res. Develop.* 36(*1*): 51–58.

*Primary Examiner*—William L. Sikes
*Assistant Examiner*—Tarifur R. Chowdhury
*Attorney, Agent, or Firm*—Scully, Scott, Murphy & Presser; Daniel P. Morris, Esq

[57] ABSTRACT

A method and apparatus is presented for transmissive liquid crystal display devices with increased apparent aperture ratios. The aperture ratio is increased by focusing light into the transparent area using a microlens array on a per pixel basis. The method includes the steps of forming a top substrate having a sacrificial substrate adhered to a first transmissive substrate, a transmissive electrode layer adhered to the first transmissive substrate in which a plurality of color filters are disposed, the top substrate further having a rubbing layer formed proximate to the transmissive electrode layer. Forming a bottom substrate comprising a second transmissive substrate and a thin film transistor array disposed within the second transmissive substrate. Disposing a sealing material on one of the top or bottom substrates so as to form an outline of display. Aligning and assembling the top and bottom substrates together such that the sealing material is sandwiched between the top and bottom substrates which are maintained at a constant separation of a few microns uniformly across the display with the help of spacer balls or posts and the rubbing layer is proximate to the thin film transistor array. Releasing the sacrificial substrate from the first transmissive substrate and adhering a microlens array to the first transmissive substrate. Lastly, filling the outline of sealing material with liquid crystal material and sealing the liquid crystal material. Also provided is an apparatus for carrying out the method of the present invention.

16 Claims, 4 Drawing Sheets

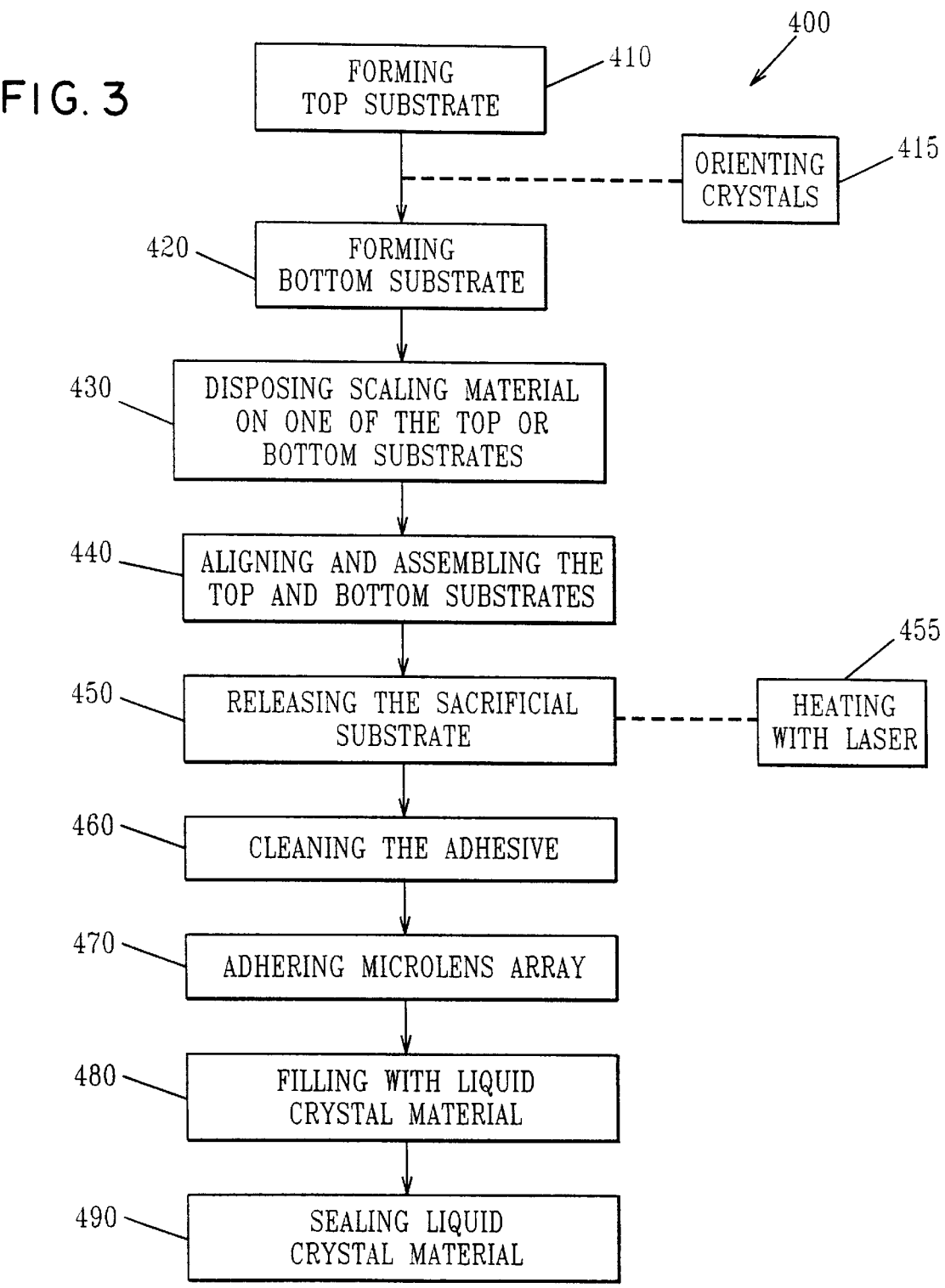

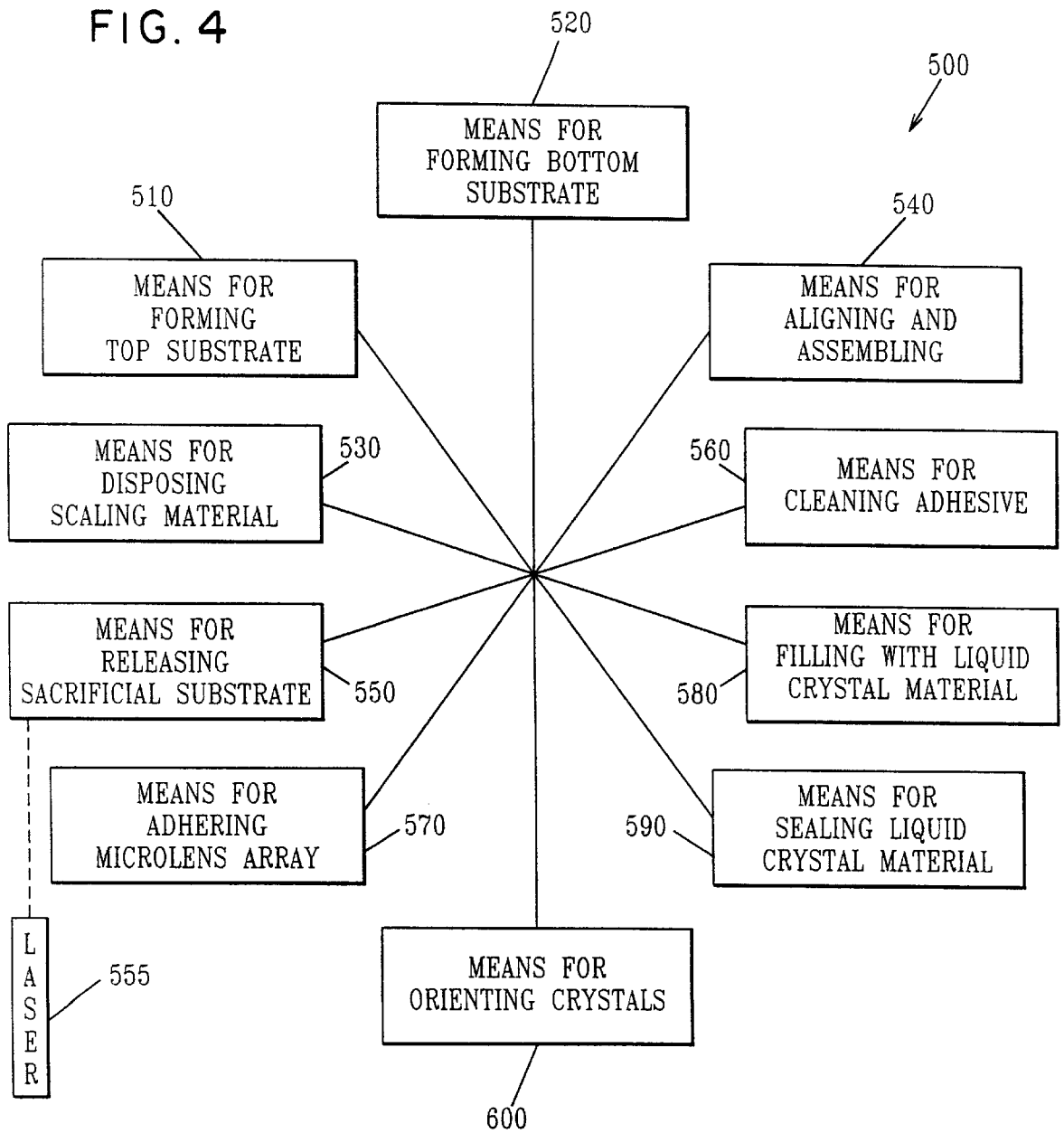

METHOD AND APPARATUS FOR INTEGRATING MICROLENS ARRAY INTO A LIQUID CRYSTAL DISPLAY DEVICE USING A SACRIFICIAL SUBSTRATE

BACKGROUND OF THE INVENTION

1. Field of the Invention

The field of art to which this invention relates is display devices. It is more particularly directed to transmissive displays.

2. Description of the Related Art

It is a constant endeavor to find ways of improving display device design and manufacturing techniques. This is particularly important as developing display technologies require smaller and smaller pixel sizes. Among other things, this requires that the aperture ratios of transmissive liquid crystal devices be maximized to increase light throughput and/or to save battery power. These are both important criteria in judging the performance of a transmissive display. Currently the achieved pixel aperture ratios of transmissive liquid crystal devices are around 50–60% for amorphous direct view displays, and 30–50% for polysilicon or single crystal silicon panels. This also has utilization for projection displays and head-mounted displays. As the number of pixels in the liquid crystal panel is increased, the aperture ratio is decreased if special design techniques are not implemented. The aperture ratio is the ratio of area occupied by the clear portion of the pixel to that occupied by the light obscuring portion.

The light obscuring portion includes a thin film transistor, a storage capacitor and the display row and column lines. Consequently, the aperture ratio of display devices must be carefully engineered in order to stay competitive in the transmissive display area.

It is known that the apparent aperture ratios of transmissive liquid crystal display devices can be increased by focusing light into the transparent area using a microlens array on a per pixel basis. One way to increase the pixel light throughput, is to focus the light into the clear area of each pixel using a microlens array. A prior art microlens array is fabricated on the color filter side of the LCD panel. More specifically, the microlens array is placed inside the cell facing the liquid crystal, as shown in FIG. 1. This solution requires major modification of the processing steps and effects the reliability, cost and manufacturing yield of the device. FIG. 1 shows a borosilicate glass 110, having sealing material 150 disposed upon it such as to form an outline of the display. Liquid crystal 160 material is included within the outline. A top substrate 180 includes a layer of plastic film 130, disposed upon the liquid crystal 160 material. A microlens array is affixed upon a glass carrier 120 disposed upon the plastic film.

The liquid crystal display devices of the prior art employ a structure consisting of a top glass substrate containing the color filters 200, a bottom glass substrate containing the thin film transistor 210, and back light (not shown). The space between the two glass substrates is taken up by the liquid crystal 160. A rubbing layer 220 is formed adjacent to the liquid crystal material to orient the crystals.

SUMMARY OF THE INVENTION

It is an object of the present invention to provide a method and apparatus for transmissive liquid crystal display devices with increased transmission resulting in increased apparent aperture ratios. The aperture ratio is increased by focusing light into the transparent area using a microlens array on a per pixel basis. Structures and methods are disclosed wherein this is achieved by placing and/or laminating the microlens array externally to the TFT/LCD/color filter cell.

It is another object of the present invention to overcome the manufacturing problems associated with prior art fabrication of the liquid crystal display having an external microlens array in which the continued use of proven previously developed and established manufacturing processes are utilized. Thus use can be made of any in-place display manufacturing lines with changes necessary only in end processes.

It is yet another object of the present invention to build the microlens array structure on a separate glass carrier and to then subsequently attach it to the liquid crystal display panel. The display panels are produced on a production line which is already established and optimized for yield. The integration of the microlens array with the display panel improves performance and are brought about in a manner which does not to disturb the yield optimized production process of the display panels.

Accordingly, a method for forming a liquid crystal display having a plurality of pixels is provided. The method comprising the steps of forming a top substrate comprising a sacrificial substrate adhered to a first transmissive substrate, a transmissive electrode layer adhered to the first transmissive substrate in which a plurality of color filters are disposed, and a rubbing layer formed proximate to the transmissive electrode layer. A next or concurrent step is provided in which a bottom substrate is formed comprising a second transmissive substrate and a thin film transistor array disposed on the second transmissive substrate. A subsequent step of disposing a sealing material on the periphery of one of the top or bottom substrates so as to form an outline of the display is provided. Next, the top and bottom substrates are aligned and assembled together such that the sealing material is sandwiched between the top and bottom substrates and the color filter substrate is proximate to the thin film transistor array. Spacers in the form of balls or posts are placed between the two substrates to maintain a constant separation of a few microns uniformly across the whole display. The sacrificial substrate is then released from the first transmissive substrate and a microlens array is adhered to the first transmissive substrate. The liquid crystal material is then injected between the two substrates through a fill port and ends sealed.

Another aspect of the present invention is an apparatus for fabricating a liquid crystal display having a plurality of pixels. The apparatus comprises a means for forming a top substrate comprising a sacrificial substrate adhered to a first transmissive substrate, a transmissive electrode layer adhered to the first transmissive substrate in which a plurality of color filters are disposed, and a rubbing layer formed proximate to the transmissive electrode layer. Also provided is a means for forming a bottom substrate comprising a second transmissive substrate and a thin film transistor array disposed on the second transmissive substrate and a means for disposing a sealing material on one of the top or bottom substrates so as to form an outline of the display panel. A means for aligning and assembling the top and bottom substrates together such that the sealing material is sandwiched between the top and bottom substrates and the color filter substrate is proximate to the thin film transistor array is also provided. A means for releasing the sacrificial substrate from the first transmissive substrate and a means for adhering a microlens array to the first transmissive substrate is provided. Lastly, a means for filling with liquid crystal material and a means for sealing the liquid crystal material are provided.

BRIEF DESCRIPTION OF THE DRAWINGS

These and other features, aspects, and advantages of the apparatus and methods of the present invention will become better understood with regard to the following description, appended claims, and accompanying drawings where:

FIG. 3 illustrates the steps of a method of the present invention for fabricating a liquid crystal display panel with an external microlens array.

FIG. 4 illustrates an apparatus for fabricating a liquid crystal display panel with an external microlens array utilizing the method of the present invention.

DETAILED DESCRIPTION OF THE INVENTION

The present invention is a method and apparatus which increases the light throughput in a display through the use of a microlens array attached externally to the display cell. The microlens array focuses the light into the clear area of each pixel of the display. This increases the apparent pixel aperture ratio by boosting the pixels light efficiency.

Figure 2A:
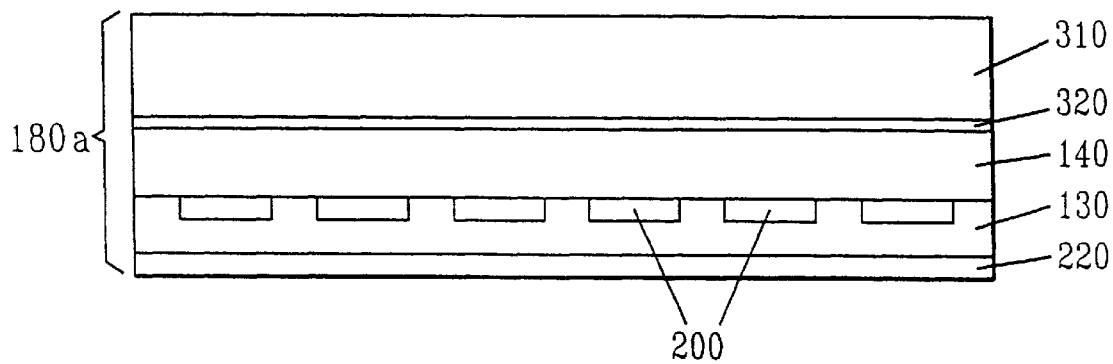
FIG. 2A illustrates a top substrate of the present invention having a sacrificial substrate adhered thereto.

Referring now to FIG. 3, there is illustrated a flow chart outlining the steps of a method for forming a liquid crystal display having a plurality of pixels, and generally referred to by reference numeral 400. A top substrate is formed at step 410. The top substrate 180a, as illustrated in FIG. 2A, comprises a sacrificial substrate 310 adhered to a first transmissive substrate 140. The sacrificial substrate 310 is preferably glass with a thickness of 0.7 millimeters. The first transmissive substrate 140 is fabricated from glass or plastic film, preferably a 0.3 millimeter thick plastic film. The sacrificial substrate 310 and the first transmissive substrate 140 are adhered to each other in any method known in the art, preferably with an adhesive layer 320. Furthermore, the adhesive is preferably polyimide based.

The top substrate 180a further includes a transmissive electrode layer 130 adhered to the first transmissive substrate 140 in which a plurality of color filters 200 are disposed. The transmissive electrode layer 130 is preferably indium tin oxide deposited by any means known in the art. The color filters 200 can be repeating groups of red blue and green filters in the case of a color liquid crystal panel, or a single layer of color filter in the case of a monochrome display panel. The top substrate 180a further having a rubbing layer 220 formed proximate to the transmissive electrode layer 130 for orienting the liquid crystals in a predetermined orientation at step 415. The rubbing layer and the orientation of the crystals are formed by any means known in the art such as by mechanically rubbing a thin polyimide film.

Figure 2B:
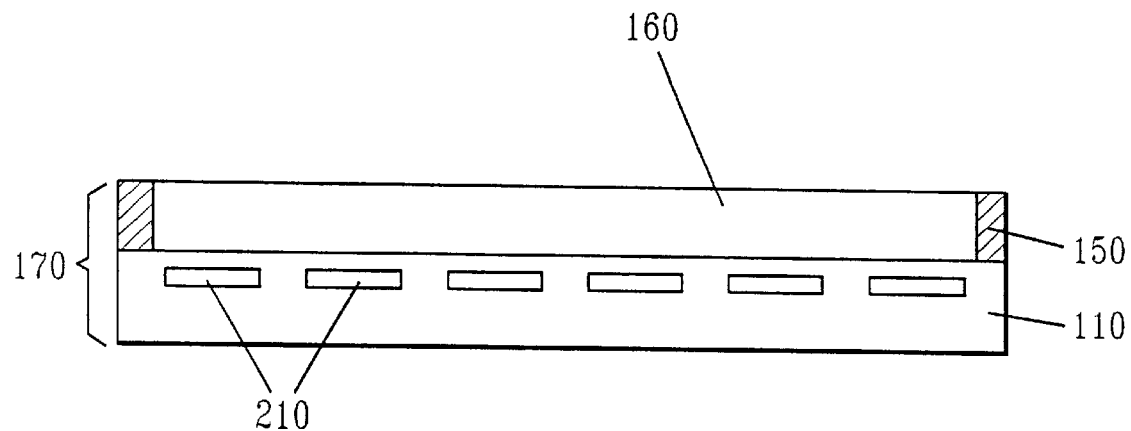
FIG. 2B illustrates a bottom substrate of the present invention having sealing material disposed thereon.

Referring back to FIG. 3, a bottom substrate is then formed at step 420. The bottom substrate can be formed subsequent to, prior to, or concurrently with, the formation of the top substrate. The bottom substrate 170, as is illustrated in FIG. 2B, comprises a second transmissive substrate 110. The second transmissive substrate is preferably glass, such as borosilicate, and has a thickness within the range of 0.3 to 1.1 millimeters. The bottom substrate 170 further has a thin film transistor array 210 disposed within the second transmissive substrate 110. The second transmissive substrate and the thin film transistor array are formed by any method known in the art such as by lithographic printing.

Referring back to FIG. 3, a sealing material is formed on one of the top or bottom substrates at step 430 so as to form the display outline and also acts as a containment barrier for the liquid crystal material which is subsequently filled into the liquid crystal panel. The sealing material 150, as illustrated in FIG. 2B is preferably deposited upon the first transmissive substrate 110 by any method known in the art, such as by precision glue dispensing means.

Figure 2C:
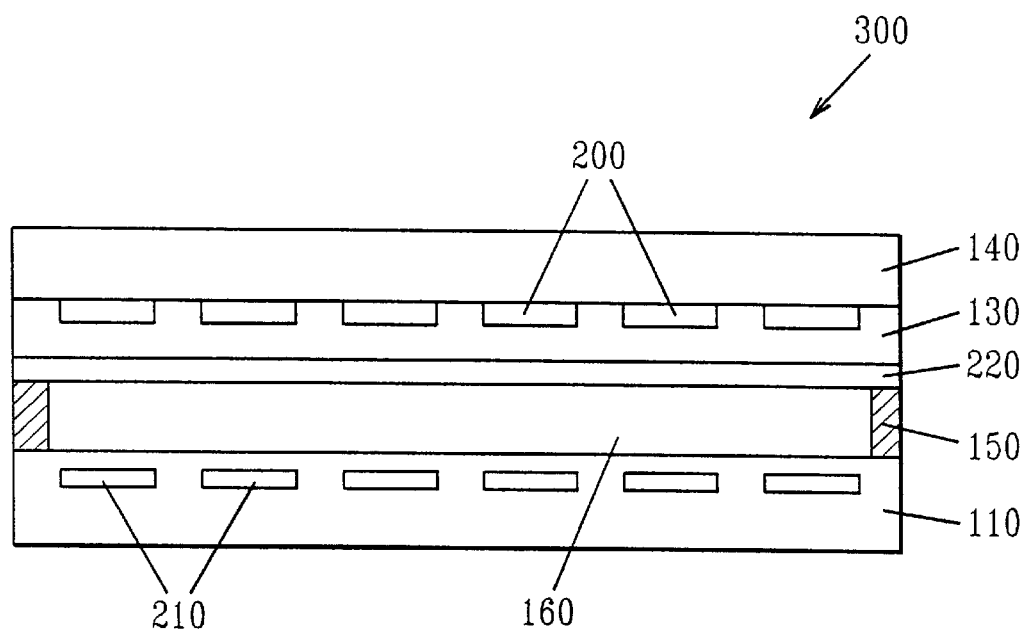
FIG. 2C illustrates a liquid crystal display panel of the present invention prior to adhesion of the microlens array.

Again referring back to FIG. 3, the top and bottom substrates are aligned and assembled together at step 440. As is illustrated in FIG. 2C, the top and bottom substrates 180a, 170, respectively, are joined such that the sealing material 150 is sandwiched between the top and bottom substrates 180a, 170 and the rubbing layer 220 is proximate to the thin film transistor. Spacers in the form of balls or posts are placed between the two substrates to maintain a constant separation of a few microns uniformly across the whole display. The sealing material 150 creates a void between the top and bottom substrates 180a, 170 for subsequent liquid crystal material to be filled therein. Alignment and assembly of the top and bottom substrates 180a, 170 is achieved by any methods known in the art, such as by automated optical alignment means.

Referring back to FIG. 3, the sacrificial substrate is released from the first transmissive substrate at step 450. Referring to FIG. 2C, the liquid crystal panel is shown after release of the sacrificial substrate 310, the panel without the sacrificial substrate 310 being referred to generally by reference numeral 300. If an adhesive layer 320 is used, then the preferred method for releasing the sacrificial substrate 310 is by heating the sacrificial substrate 120, shown as step 455 in FIG. 3. The sacrificial substrate 120 is heated until the adhesive layer 320 liquefies and the adhesive bond between the sacrificial substrate 310 and the first transmissive substrate 140 is broken or relaxed. The preferred method of heating the sacrificial substrate at step 455 is achieved by directing a laser onto the sacrificial substrate 310.

Additionally, if an adhesive layer 320 is used, as is shown in FIG. 2A, the adhesive layer is cleaned at step 460 in FIG. 3 before adhesion of the microlens array. The adhesive layer is cleaned using any method known in the art, such as by chemical solvent cleaning means, mechanical cleaning means or reactive ion etching means.

Figure 1:
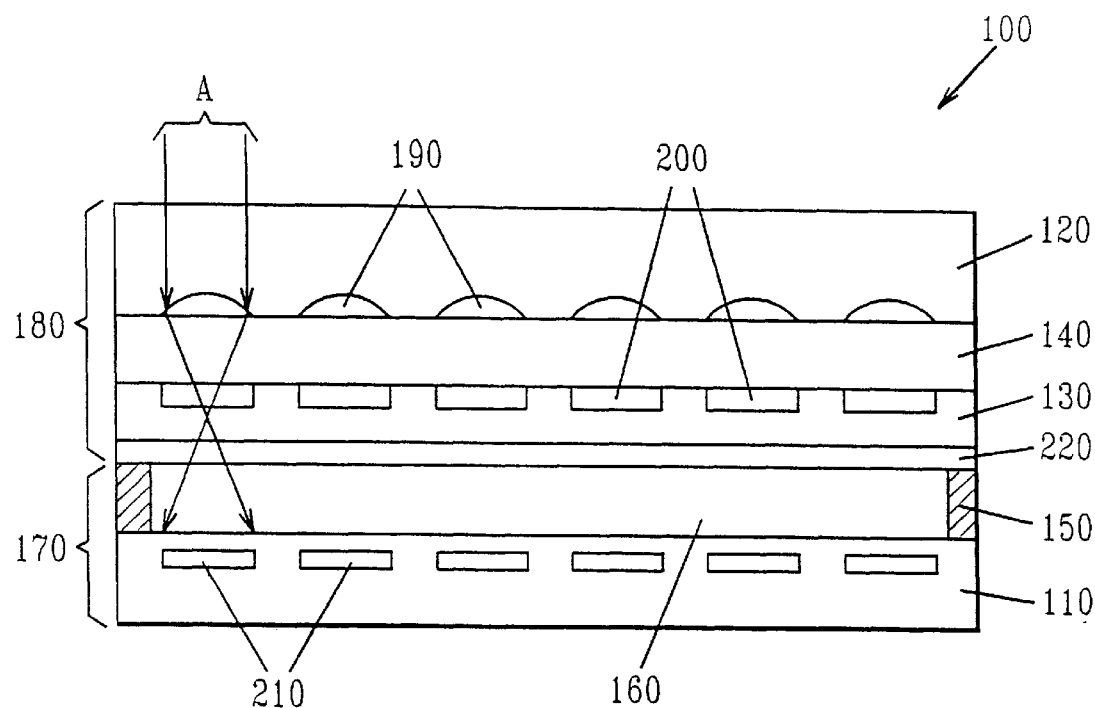
FIG. 1 illustrates a prior art liquid crystal display panel with a microlens array.

The microlens array 120 is then adhered to the first transmissive substrate at step 470 resulting in a liquid crystal display panel structurally similar to that as shown in FIG. 1. The microlens array 120 is fabricated to have its individual lenses 190 correspond with a color filter 200 and a transistor 210. Adhesion of the microlens array onto the liquid crystal display panel without the sacrificial substrate 300 is achieved by any method known in the art, such as by lamination using adhesion layers.

Referring back to FIG. 3, the outline of sealing material is filled with liquid crystal material 160 at step 480 and the crystal material 160 is then sealed at step 490. Both of these steps are carried out by any methods known in the art, such as by evacuating the cell, filling the cell with the liquid crystal material and curing the end seal with a UV source.

Also provided is an apparatus for fabricating a liquid crystal display having a plurality of pixels according to the method of the present invention. The apparatus is shown in FIG. 4 and referred to generally by reference numeral 500. The apparatus comprises a means for forming the top substrate 510. The top substrate 180a comprises a sacrificial substrate 310 adhered to a first transmissive substrate 140, a transmissive electrode layer 130 adhered to the first transmissive substrate 140 in which a plurality of color filters 200 are disposed, and a rubbing layer 220 formed proximate to the transmissive electrode layer 130. The means for forming the top substrate 510 preferably comprises a polyimide layer for adhering the sacrificial substrate 310 to the first transmissive layer 140, a boro silicate glass for forming first transmissive substrate 140 upon the sacrificial substrate 310, an ITO layer for forming the transmissive electrode layer 130 and a pigmented polymer for disposing the color filters 200 therein, and a polyimide for forming the rubbing layer and orienting the crystals on its surface. However, any means known in the art can be employed to form and position any of the components of the top substrate 180a.

A means for forming a bottom substrate 520 is also provided. The means for forming the bottom substrate 520 preferably comprises a boro silicate glass for forming the second transmissive substrate 110, a lithographic pattern for forming the thin film transistor array 200. However, any means known in the art can be employed to form and position any of the components of the bottom substrate 170.

Also provided is a means for disposing a sealing material 150 on one of the top or bottom substrates 530 so as to form an outline of the display panel. The sealing means 530 is preferably a UV curing adhesive. However, any means known in the art can be employed to dispose the sealing material 150 on one of the top or bottom substrates.

Also provided is a means for aligning and assembling the top and bottom substrates together 540 such that the sealing material 150 is sandwiched between the top and bottom substrates 180a, 170 and the color filters 200 are proximate to the thin film transistor array 210. Preferably, the aligning and assembling means 540 is a precision automated optical alignment means. However, any means known in the art can be employed for aligning and assembling the top and bottom substrates together.

Also provided is a means for releasing the sacrificial substrate from the first transmissive substrate 550. Preferably, the releasing means 550 is a laser 555 directed at the sacrificial substrate 310 for heating and liquefying the adhesive layer 320 until the bond between the sacrificial substrate 310 and the first transmissive layer 140 is broken or relaxed. However, any means known in the art can be employed for releasing the sacrificial substrate 310 from the first transmissive layer 140.

Additionally, if an adhesive layer is utilized, as is shown in FIG. 2A, then a means for cleaning the adhesive from the first transmissive layer 580 is also provided. The cleaning means 580 is preferably a chemical solvent means, mechanical cleaning means or reactive ion etching means. However, any means known in the art can be employed for cleaning the adhesive 320 from the first transmissive layer 140.

A means for adhering the microlens array to the first transmissive substrate 570 is also provided. Preferably the adhering means 570 comprises a transparent UV curing adhesive. However, any means known in the art can be employed for the adhering means, such as a thermal or UV curing.

Lastly, a means for filling the outline of sealing material with liquid crystal material 590 and a means for sealing the liquid crystal material 600 within the void created by the sealing material 160 are provided. Preferably, the filling means are evacuating the cell and filling the cell with the liquid crystal material and the sealing means 590 is a UV curing adhesive. Spacers in the form of balls or posts are placed between the two substrates to maintain a constant separation of a few microns uniformly across the whole display. However, any means known in the art can be employed for filling and sealing the liquid crystal material 160 within the void created by the sealing material 150.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A method for forming a liquid crystal display having a plurality of pixels and a plurality of microlenses using a sacrificial substrate, the method comprising the steps of:

forming a top substrate comprising a sacrificial substrate adhered to a first transmissive substrate, a transmissive electrode layer adhered to the first transmissive substrate in which a plurality of color filters are disposed, and a rubbing layer formed proximate to the transmissive electrode layer, forming a bottom substrate comprising a second transmissive substrate and a thin film transistor array disposed within the second transmissive substrate, disposing a sealing material on one of the top or bottom substrates so as to form an outline of the display containing said pixels, aligning and assembling the top and bottom substrates which are maintained together at a constant separation of a few microns uniformly across the display with the help of spacer balls or posts such that the sealing material is sandwiched between the top and bottom substrates and the rubbing layer is proximate to the thin film transistor array, releasing the sacrificial substrate from the first transmissive substrate, adhering a microlens array to the first transmissive substrate, filling the outline of sealing material with liquid crystal material, and sealing the liquid crystal material.

2. The method of claim 1, wherein the sacrificial substrate is adhered to the first transmissive substrate with an adhesive, and further comprising the step of cleaning the adhesive from the first transmissive substrate after releasing the sacrificial substrate.

3. The method of claim 2, wherein the adhesive is polyimide based.

4. The method of claim 2, wherein the releasing step comprises the sub-step of heating the sacrificial substrate until the adhesive liquefies thereby breaking the adhesive bond between the sacrificial substrate and the first transmissive substrate.

5. The method of claim 4, wherein the heating sub-step is accomplished by directing a laser onto the sacrificial substrate.

6. The method of claim 1, wherein the sacrificial substrate is glass.

7. The method of claim 1, wherein the sacrificial substrate is 0.3 to 0.7 millimeters thick.

8. The method of claim 1, wherein the first transmissive substrate is a plastic film.

9. The method of claim 1, wherein the first transmissive substrate is glass.

10. The method of claim 1, wherein the first transmissive substrate is 0.3 to 0.7 millimeters thick.

11. The method of claim 1, wherein the second transmissive substrate is glass.

12. The method of claim 1, wherein the second transmissive substrate is a thickness within the range of 0.7 to 1.1 millimeters.

13. An apparatus for fabricating a liquid crystal display having a plurality of pixels and a plurality of mircolenses using a sacrificial substrate, said apparatus comprising:

means for forming a top substrate comprising a sacrificial substrate adhered to a first transmissive substrate, a transmissive electrode layer adhered to the first transmissive substrate in which a plurality of color filters are disposed, and a rubbing layer formed proximate to the transmissive electrode layer, means for forming a bottom substrate comprising a second transmissive substrate and a thin film transistor array disposed on the second transmissive substrate, means for disposing a sealing material on one of the top or bottom substrates so as to form an outline of said display panel, means for aligning and assembling the top and bottom substrates together such that the sealing material is sandwiched between the top and bottom substrates which are maintained at a constant separation of a few microns uniformly across the display with the help of spacer balls or posts and the color filter substrate is proximate to the thin film transistor array, means for releasing the sacrificial substrate from the first transmissive substrate, means for adhering a microlens array to the first transmissive substrate, means for filling the outline of sealing material with liquid crystal material, and means for sealing the liquid crystal material.

14. The apparatus of claim 13, wherein the sacrificial substrate is adhered to the first transmissive substrate with an adhesive, and further comprising a means for cleaning the adhesive from the first transmissive substrate after releasing the sacrificial substrate.

15. The method of claim 13, wherein the means for releasing the sacrificial substrate comprises a means for heating the sacrificial substrate until the adhesive liquefies thereby breaking the adhesive bond between the sacrificial substrate and the first transmissive substrate.

16. The method of claim 15, wherein the means for heating the sacrificial substrate comprises a laser directed onto the sacrificial substrate.

* * * * *